No. 644,916. Patented Mar. 6, 1900.
W. HORNER.
SECTIONAL VEHICLE HUB.
(Application filed Nov. 9, 1899.)
(No Model.)
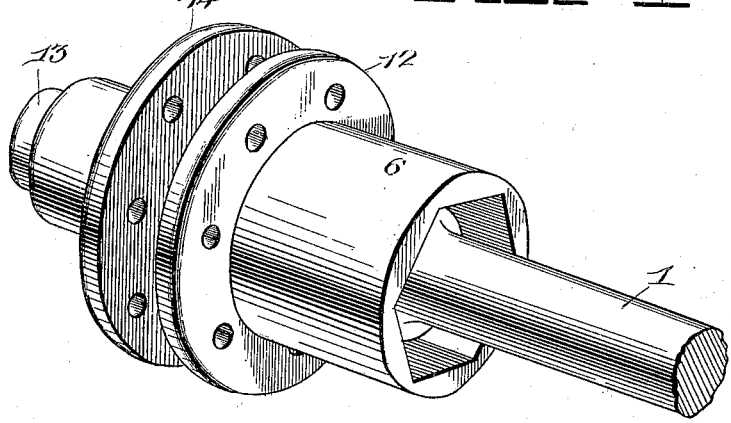
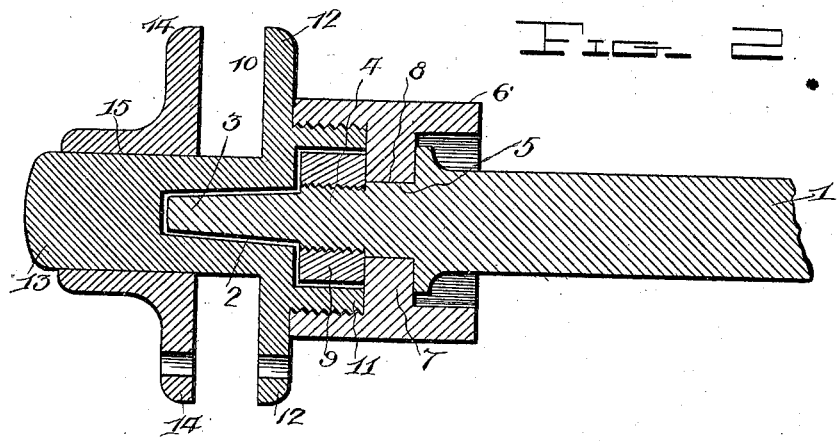
Witnesses
Inventor
William Horner,
by H. B. Willson & Co.,
Attorneys
THE NORRIS PETERS CO., PHOTO-LITHO., WASHINGTON, D. C.

UNITED STATES PATENT OFFICE.

WILLIAM HORNER, OF LINDEN, INDIANA.

SECTIONAL VEHICLE-HUB.

SPECIFICATION forming part of Letters Patent No. 644,916, dated March 6, 1900.

Application filed November 9, 1899. Serial No. 736,380. (No model.)

*To all whom it may concern:*

Be it known that I, WILLIAM HORNER, a citizen of the United States, residing at Linden, in the county of Montgomery and State of Indiana, have invented certain new and useful Improvements in Sectional Vehicle-Hubs; and I do declare the following to be a full, clear, and exact description of the invention, such as will enable others skilled in the art to which it appertains to make and use the same.

The invention relates to sectional vehicle-hubs.

The object of the invention is to provide a hub of this character which cannot possibly become accidentally detached from the axle-spindle and which shall be simple of construction, durable in use, and comparatively inexpensive of production.

In the accompanying drawings, Figure 1 is a perspective view of the hub, illustrating the application of my invention. Fig. 2 is a longitudinal sectional view.

In the drawings the same reference characters indicate the same parts of the invention.

1 denotes the vehicle-axle, and 2 its spindle. The spindle is formed with a smooth tapering outer end 3, a screw-threaded intermediate portion 4 of greater diameter than the tapering portion, and a smooth bearing-surface 5 of greater diameter than the screw-threaded portion.

6 denotes the collar, having a central partition 7, formed with an aperture 8, through which the smooth bearing portion 5 of the spindle projects. The collar at one side of the partition is adapted to be engaged by a wrench and at the other side of the partition is provided with internal screw-threads.

9 denotes a nut which engages the screw-threaded portion of the spindle and is inclosed by said collar.

10 denotes one hub-section, having an externally-threaded boss 11 to take the threads of the collar and provided with a spoke-clamping flange 12 and with a tubular extension 13. The boss of this section is screwed into the collar, and its interior wall surrounds the nut. The tapering end of the spindle projects within the tubular extension 13.

14 denotes the other section of the hub, provided with a central aperture 15, which is slipped upon the tubular extension 13. The spokes of the wheel are secured between the flanges of the hub-sections in the ordinary manner.

By referring to Fig. 2 of the drawings it will be seen that the hub-sections and the collar turn upon the spindle and that it makes no difference in which direction said sections and collar turn. There will be no tendency to loosen the parts.

In order to remove the hub, the wrench is engaged with the wrench-face of the collar and force is applied to the tubular extension. The collar being held rigid will permit of the inner section of the hub unscrewing from said collar, and after said section has been removed, together with the outer section of the hub, the nut may be unscrewed from the threaded portion of the spindle and all the parts be separated.

From the foregoing description, taken in connection with the accompanying drawings, the construction, operation, and advantages of my improved vehicle-hub will be readily apparent without requiring an extended explanation. It will be seen that the device is simple of construction, that said construction permits of its manufacture at a small cost, and that it is exceedingly well adapted for the purpose for which it is designed, and it will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

The combination with an axle-spindle provided with a tapering outer end, an intermediate screw-threaded portion, and a smooth bearing portion; of a collar having a perforated partition to engage the smooth bearing portion and being provided with internal screw-threads, a nut screwed upon the screw-threaded portion of the spindle and located within the collar, a hub-section having a screw-threaded boss to engage the screw-threads of the collar and provided with a tubular extension to receive the outer end of the spindle, and a second hub-section mounted upon the tubular extension, substantially as and for the purpose set forth.

In testimony whereof I have hereunto set my hand in presence of two subscribing witnesses.

WILLIAM HORNER.

Witnesses:
   ED LAYTON,
   JOHN L. CHURCH.